US005628109A

United States Patent [19]

Neuman

[11] Patent Number: 5,628,109

[45] Date of Patent: May 13, 1997

[54] LOCK CYLINDER MAINTENANCE TOOL

[76] Inventor: Martin Neuman, 236 W. Portal Ave. #806, San Francisco, Calif. 94127

[21] Appl. No.: 422,709

[22] Filed: Apr. 14, 1995

[51] Int. Cl.$^6$ .......... B23P 19/00

[52] U.S. Cl. .......... 29/804; 29/270; 81/15.9

[58] Field of Search .......... 29/804, 270; 81/3.36, 81/15.9; 70/394, 466

[56] References Cited

U.S. PATENT DOCUMENTS

| | | | |
|---|---|---|---|
| 2,774,133 | 12/1956 | Sitz | 29/270 |
| 3,664,007 | 5/1972 | Schlage . | |
| 3,816,899 | 6/1974 | Kitts . | |
| 4,305,314 | 12/1981 | Simpson . | |
| 4,667,494 | 5/1987 | Joosten | 81/15.9 X |
| 4,675,994 | 6/1987 | Detloff . | |
| 4,680,860 | 7/1987 | Detloff . | |

*Primary Examiner*—Peter Vo
*Assistant Examiner*—Khan Nguyen
*Attorney, Agent, or Firm*—Virginia H. Meyer

[57] ABSTRACT

A tool for effecting inspection, maintenance and/or replacement of pins within a lock cylinder. The inventive device includes a cylindrical portion having an outside diameter corresponding to a diameter of a plug being removed from a lock cylinder. A non-cylindrical portion colinearly extends from the cylindrical portion and includes a reducing exterior wall characterized by a decreasing radius from a longitudinal center of the tool. The non-cylindrical portion permits a desired number of pins to be lowered from the lock cylinder at a desired speed for inspection, maintenance and/or removal thereof.

5 Claims, 3 Drawing Sheets

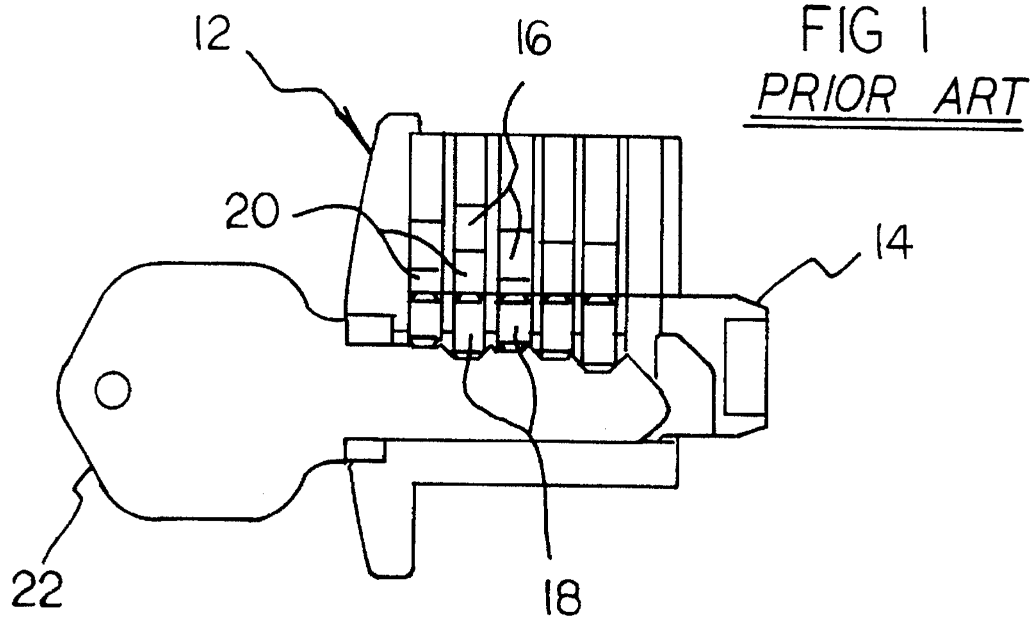
FIG 1
PRIOR ART
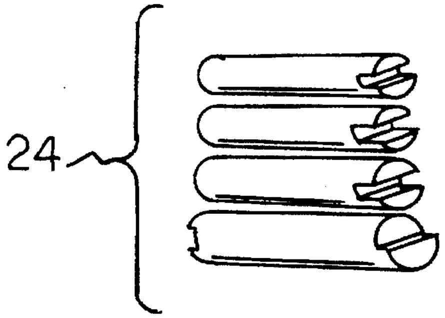
FIG 2
PRIOR ART
FIG 3
PRIOR ART
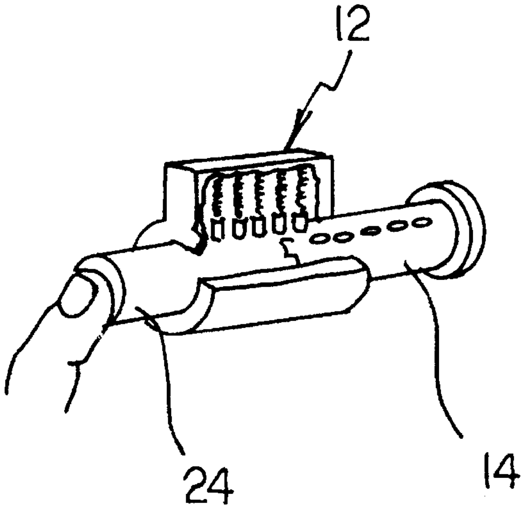

FIG 6
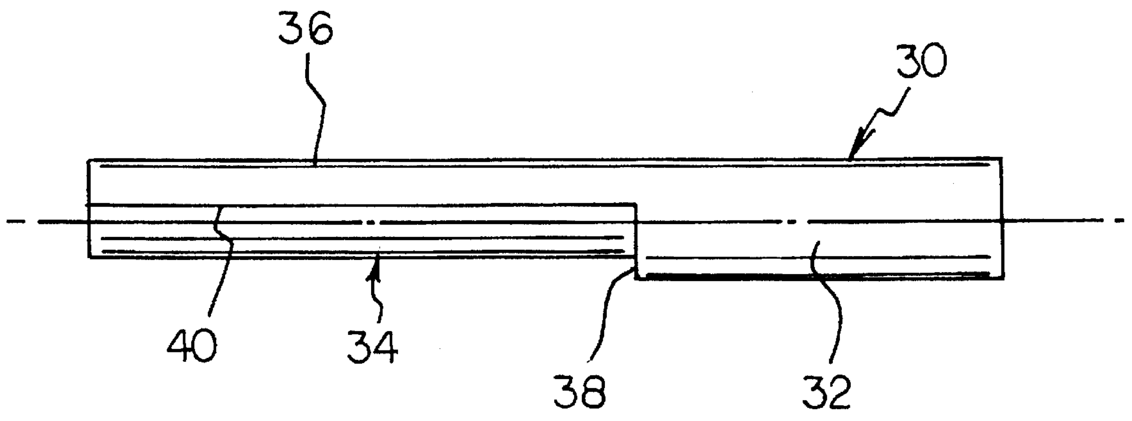
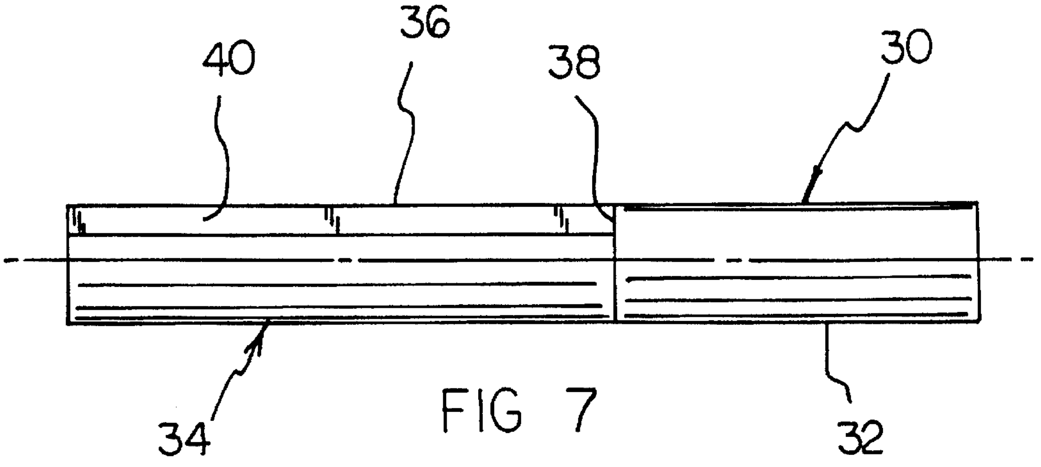
FIG 7

LOCK CYLINDER MAINTENANCE TOOL

BACKGROUND OF THE INVENTION

1. Field of the Invention

The present invention relates to lock servicing devices and more particularly pertains to a lock cylinder maintenance tool for effecting inspection and maintenance of pins within a lock cylinder.

2. Description of the Prior Art

The use of lock servicing devices is known in the prior art. Known prior art lock servicing devices include U.S. Pat. No. 4,680,860 issued Jul. 21, 1987 to John C. Detloff for "Apparatus for Disassembling Locks"; U.S. Pat. No. 4,675,994 issued Jun. 30, 1987 to John C. Detloff for "Locksmith's Tool For Installing Springs and Driver Pins Into Pin Tumbler Locks"; U.S. Pat. No. 4,305,314 issued Dec. 15, 1981 to Ernest I. Simpson for "Tool for Changing Master Pins In an Almont Lock"; U.S. Pat. No. 3,816,899, issued Jun. 18, 1974 to George J. Kitts for a "Lock Core Puller For Spring Retained Locks"; and U.S. Pat. No. 3,664,007 issued May 23, 1972 to Ernest L. Schlage for "Cylinder Loading Tool".

While these devices fulfill their respective, particular objectives and requirements, the aforementioned patents do not disclose a lock cylinder maintenance tool for effecting inspection and maintenance of pins within a lock cylinder which includes a cylindrical portion having an outside diameter corresponding to a diameter of a plug being removed from the lock, and a non-cylindrical portion colinearly extending from the cylindrical portion and including a reducing exterior wall characterized by a decreasing radius from a longitudinal center of the tool, wherein the non-cylindrical portion permits a desired number of pins to be lowered from the lock at a desired rate for inspection and/or removal thereof.

In these respects, the lock cylinder maintenance tool according to the present invention substantially departs from the conventional concepts and designs of the prior art, and in so doing provides an apparatus primarily developed for the purpose of effecting inspection and maintenance of pins within a lock cylinder.

SUMMARY OF THE INVENTION

In view of the foregoing disadvantages inherent in the known types of lock servicing devices now present in the prior art, the present invention provides a new lock cylinder maintenance tool construction wherein the same can be utilized for servicing a lock cylinder. As such, the general purpose of the present invention, which will be described subsequently in greater detail, is to provide a new lock cylinder maintenance tool apparatus and method which has many of the advantages of the lock servicing devices mentioned heretofore and many novel features that result in a lock cylinder maintenance tool which is not anticipated, rendered obvious, suggested, or even implied by any of the prior art lock cylinder servicing devices, either alone or in any combination thereof.

To attain this, the present invention generally comprises a tool for effecting inspection, maintenance and/or replacement of pins within a lock cylinder. The inventive device includes a cylindrical portion having an outside diameter corresponding to a diameter of a plug being removed from a lock cylinder. A non-cylindrical portion colinearly extends from the cylindrical portion and includes a reducing exterior wall characterized by a decreasing radius from a longitudinal center of the tool. The non-cylindrical portion permits a desired number of pins to be lowered from the lock cylinder at a desired speed for inspection and/or removal thereof.

There has thus been outlined, rather broadly, the more important features of the invention so that the following detailed description of the invention may be better understood, and so that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new lock cylinder maintenance tool apparatus and method which has many of the advantages of the lock servicing devices mentioned heretofore and many novel features that result in a lock cylinder maintenance tool which is not anticipated, rendered obvious, suggested, or even implied by any of the prior art lock servicing devices, either alone or in any combination thereof.

It is another object of the present invention to provide a new lock cylinder maintenance tool which may be easily and efficiently manufactured and marketed.

It is a further object of the present invention to provide a new lock cylinder maintenance tool which is of a durable and reliable construction.

An even further object of the present invention is to provide a new lock cylinder maintenance tool which is susceptible of a low cost of manufacture with regard to both materials and labor, and which accordingly is then susceptible of low prices of sale to the consuming public, thereby making such lock cylinder maintenance tools economically available to the buying public.

Still yet another object of the present invention is to provide a new lock cylinder maintenance tool which provides in the apparatuses and methods of the prior art some of the advantages thereof, while simultaneously overcoming some of the disadvantages normally associated therewith.

Still another object of the present invention is to provide a new lock cylinder maintenance tool for effecting inspection and maintenance of pins within a lock cylinder.

Yet another object of the present invention is to provide a new lock cylinder maintenance tool which includes a cylindrical portion having an outside diameter corresponding to a diameter of a plug being removed from the lock, and a non-cylindrical portion colinearly extending from the cylindrical portion and including a reduce exterior wall characterized by a decreasing radius from a longitudinal center of the tool, wherein the non-cylindrical portion permits a desired number of pins to be lowered from the lock at a desired rate for inspection and/or removal thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a cross sectional view of a typical prior art lock with which the present invention can be utilized.

FIG. 2 is an isometric illustration of a plurality of prior art following tools.

FIG. 3 is an isometric illustration, partially in cross section, of a single prior art following tool in use.

FIG. 6 is a top plan view of the lock cylinder maintenance tool of the present invention.

FIG. 7 is a side elevation view of the lock cylinder maintenance tool of the present invention.

DETAILED DESCRIPTION

Figure 4:
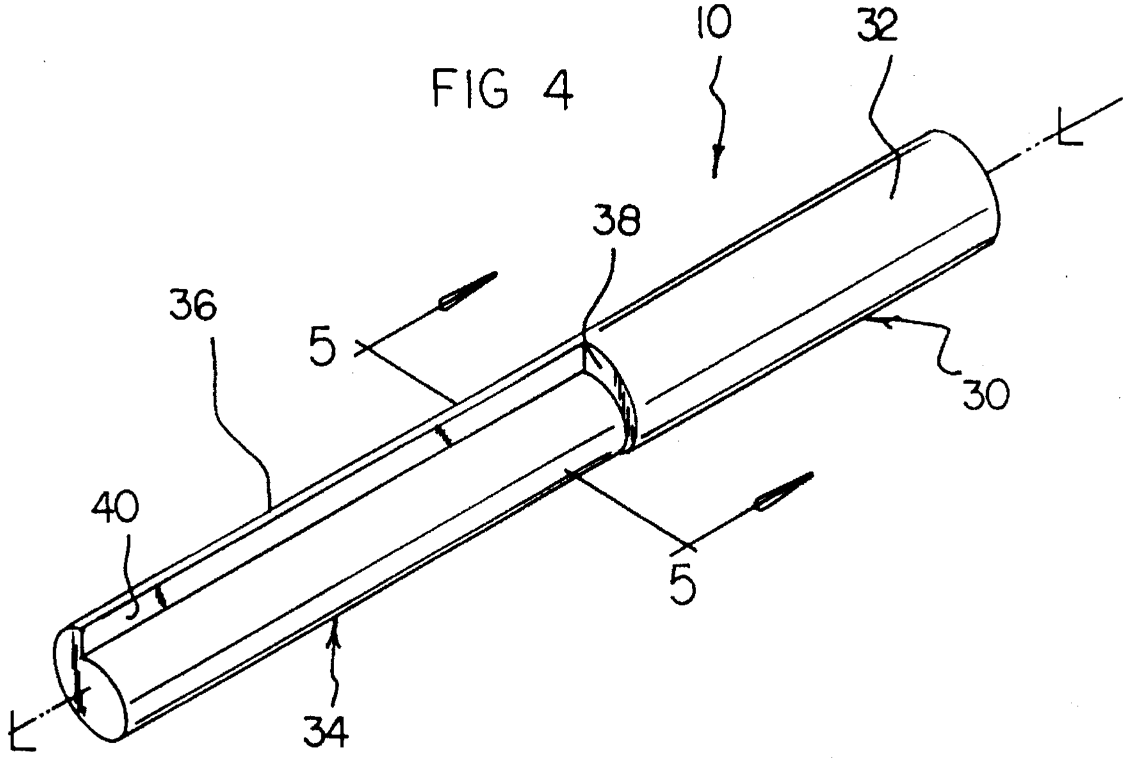
FIG. 4 is a lock cylinder maintenance tool according to the present invention.

With reference now to the drawings, and in particular to FIGS. 4–7 thereof, a new lock cylinder maintenance tool embodying the principles and concepts of the present invention and generally designated by the reference numeral 10 will be described.

Turning initially to FIGS. 1 through 3 wherein known prior art is illustrated, it can be shown that a typical lock cylinder 12 includes a plug 14 rotatably positioned therein. A plurality of top pins 16 are movably mounted within the lock cylinder 12 and operate to abuttingly engage a plurality of bottom pins 18 movably mounted within the plug 14. Further, master pins 20 may be interposed between the top pins 16 and the bottom pins 18 in some lock cylinders 12. The pins 16–20 operate to preclude rotation of the plug 14 relative to the remainder of the lock cylinder 12 in the absence of a key 22. However, when the appropriate key 22 is inserted to the plug 14, the pins 16–20 become aligned so as to permit rotation of the plug 14 relative to a remainder of the lock cylinder 12. During servicing of the lock cylinder 12, it is often desirable to effect removal of the plug 14 and one or more of the pins 16–20. To this end, and as shown in FIG. 2, the prior art has employed a plurality of cylindrical followers 24 of various diameters. As shown in FIG. 3, a cylindrical follower 24 having a diameter substantially equal to a diameter of the plug 14 can be inserted into the lock 12 to effect projection of the plug 14 therefrom, whereby the follower 24 can be selectively removed from the lock 12 to permit the pins to fall therefrom.

Referring now to FIGS. 4 through 7 wherein the lock maintenance tool 10 according to the present invention is illustrated in detail, it can be shown that the same substantially departs from the designs of the prior art cylindrical followers 24 and comprises a cylindrical portion 30 symmetrically oriented about a longitudinal axis "L" directed longitudinally therethrough. The cylindrical portion 30 includes a cylindrical side wall 32 characterized as having a constant radius from the longitudinal axis. Further, the present invention 10 additionally comprises a non-cylindrical portion 34 projecting from the cylindrical portion 30 and colinearly aligned relative thereto. The non-cylindrical portion 34 includes a reducing exterior side wall 36 characterized as having a non-constant radius relative to the longitudinal axis of the device 10. By this structure, a transverse wall 38 is defined at a juncture of the cylindrical portion 30 and the non-cylindrical portion 34 which extends substantially orthogonally relative to the longitudinal axis as shown in FIG. 4 of the drawings. Further, a longitudinal wall 40 is defined along the non-cylindrical portion 34 as a result of the decreasing radius of the reducing exterior side wall 36 and extends substantially parallel to the longitudinal axis of the tool 10.

The lock cylinder maintenance tool 10 can thus be utilized to push a plug 14 from an associated lock cylinder 12. To this end, either of the longitudinally opposed ends of the tool 10 can be inserted into the lock cylinder 12 to effect removal of the plug 14. In the case of initial insertion of the non-cylindrical portion 34 into the lock cylinder 12 to effect removal of the plug 14, it is desirable that a portion of the reducing exterior side wall 36 having a maximum cross sectional diameter intersecting the longitudinal axis "L" directed through the tool 10 be positioned into alignment with the pins 16–20. In the case of insertion of the cylindrical portion 30 initially into the lock 12, an angular orientation of the device is initially unimportant. With the non-cylindrical portion 34 of the tool 10 positioned within the lock cylinder 12, the tool 10 can be rotated about the longitudinal axis so as to allow one or more of the pins 16–20 such as the master pins 20 to egress from the lock 12. To this end, a rotation of the tool 10 such that the longitudinal wall 40 passes beneath the pins 16–20 will result in a sudden egress of the pins from the lock cylinder 12. Alternatively, a rotation of the tool 10 in an opposite direction such that the pins traverse the reducing exterior side wall 36 to eventually abut the longitudinal wall 40 of the non-cylindrical portion 34 will result in a gradual egress of the desired pins 16–20 from the lock cylinder 12. After a desired number or type of the pins 16–20 have been removed from the lock cylinder 12, the device 10 can be rotated so as to cause the remaining pins to again enter the lock cylinder 12 as desired.

If it should be desired by an end user to remove any of the pins 16–20 in a sequential or individual manner, the device 10 may be so employed by simply initially inserting the cylindrical portion 30 into the lock cylinder 12 to effect removal of the plug 14 therefrom. The transverse wall 38 of the device 10 can then be positioned between adjacent pins 16–20 such that a desired number of pins are positioned into contact with the non-cylindrical portion 34. Operation of the tool 10 may then commence as described above to effect sudden or gradual removal of a desired number of pins. By this structure, the present invention allows for easy removal of all existing master pins in a single operation. Alternatively, the master pins can be removed from individual chambers of the lock cylinder so as to allow an individual the opportunity to decode an existing master-key system. Further, the device 10 facilitates visual inspection of the lock cylinder 12 so as to ascertain the contents of the chambers thereof. Visual inspection of the cylinder hole within which the plug resides, as well as of the function of the top pins and springs can also be ascertained through a use of the device 10.

Figure 5:
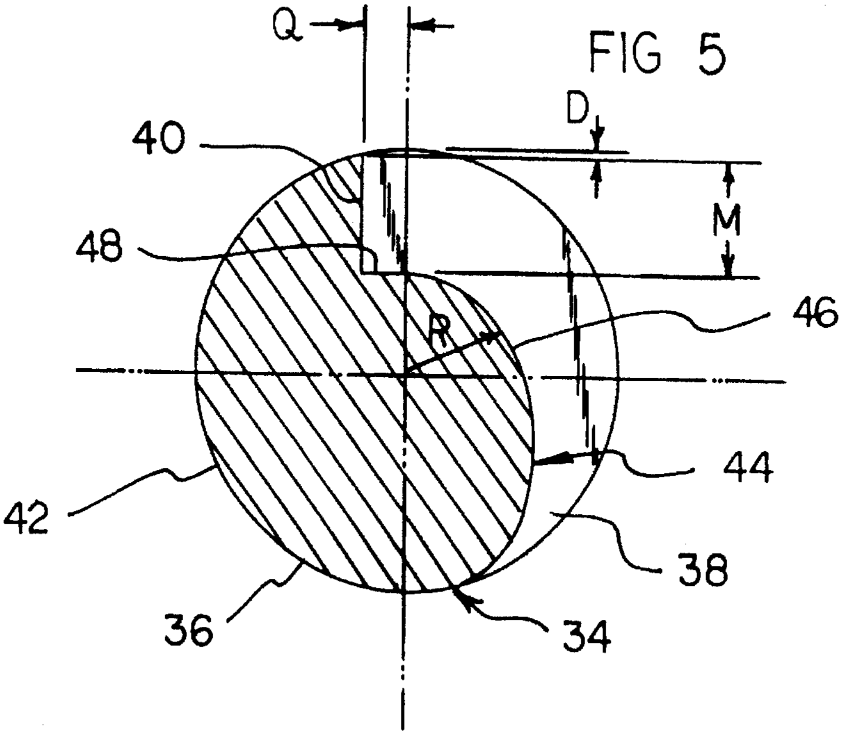
FIG. 5 is a cross sectional view taken along line 5—5 of FIG. 4.

Referring now to FIG. 5 wherein a cross sectional illustration of the non-cylindrical portion 34 is illustrated in detail, it can be shown that the reducing exterior side wall 36 of the non-cylindrical portion 34 preferably comprises an exterior semi-cylindrical side wall 42 extending into contiguous communication with a portion of the cylindrical wall 32 of the cylindrical portion 30. The exterior semi-cylindrical side wall 42 of the reducing exterior side wall 36 is characterized as having a constant radius of curvature from the longitudinal axis of the tool 10. The reducing exterior side wall 36 continues from the exterior semi-cylindrical side wall 42 into a curvilinear side wall 44 characterized as having a decreasing radius of curvature. The curvilinear side wall 44 continues into an interior semi-cylindrical side wall 46 characterized as having a constant radius of curvature substantially less than the radius of curvature of the exterior semi-cylindrical side wall 42 and the cylindrical side wall 32. The interior semi-cylindrical side wall 46 continues into a resting wall 48 of preferably planar configuration which orthogonally intersects a longitudinal wall 40 extending substantially parallel to a plane directed through the longitudinal axis "L" and orthogonally intersecting the resting wall 48. Alternatively, the longitudinal wall 40 can be oriented so as to extend at an oblique angle relative to the plane directed through the longitudinal axis "L" and orthogonally intersecting the resting wall 48.

Preferred dimensions of the present invention 10 include sizing the radius of the cylindrical portion and the radius of the exterior semi-cylindrical side wall equal to approximately the radius of an aperture extending through the lock cylinder 12 into which the device 10 is to positioned. The semi-cylindrical side wall 42 preferably extends through an arc of greater than 180 degrees, but may also be configured to extend through an arc of less than 180 degrees if deemed desirable. The resting wall 48 is desirably configured so as to have a transverse dimension "Q" oriented substantially orthogonally to the longitudinal axis "L" equal to approximately the radius of one of the pins 16–20 of the lock 12 cylinder to which the device 10 is to be associated. Preferably the distance "M" is equal to a length of the longest master pin 20 of the associated lock cylinder 12. The radius "R" of curvature of the interior semi-cylindrical side wall 46 can then be found from the following equation:

$$R=P-(M+D)$$

wherein "P"=a radius of the aperture directed through the lock 12 within which the plug 14 normally resides, "M" is the length of the longest master pin as defined above, and "D" is determined by the following equation:

$$D=P-(\text{square root of } [P^2-Q^2])$$

wherein "Q" is the radius as defined above.

Further, the preferred embodiment of the present invention 10 is characterized by the interior semi-cylindrical side wall 46 extending through an arc of approximately forty-five degrees or more. However, the interior semi-cylindrical side wall 46 may also extend through an arc less than forty-five degrees if so desired. A preferred length of the tool 10 is equal to approximately four times a longitudinal length of the plug 14 of the lock cylinder 12 to which the device 10 is to be associated. The transverse wall 38 can be formed at any desired longitudinal position of the device 10 and is preferably positioned a distance away from either end of the tool equal to at least a longitudinal length of the plug 14.

The present invention may be constructed of any known material, such as metal, plastic, wood, or combinations thereof. Methods of forming the present invention include machining, casting, forced extrusion, injection molding, welding, or combinations of such methods.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follow:

1. A lock cylinder maintenance tool comprising:

a non-cylindrical portion including a reducing exterior side wall;

said non-cylindrical portion having a centerline, said reducing exterior side wall comprising a longitudinal side wall, an exterior semi-cylindrical side wall, a curvilinear side wall, an interior semi-cylindrical side wall, and a resting wall;

said exterior semi-cylindrical side wall continuing from said longitudinal wall, said exterior semi-cylindrical side wall having a constant radius of curvature from said centerline, said exterior semi-cylindrical side wall continuing into said curvilinear side wall, said curvilinear side wall characterized as having a decreasing radius of curvature from said centerline, said curvilinear side wall continuing into said interior semi-cylindrical side wall, said interior semi-cylindrical side wall having a constant radius of curvature from said centerline substantially less than the radius of curvature of the exterior semi-cylindrical side wall, said interior semi-cylindrical side wall continuing into said resting wall, said resting wall being of substantially planar configuration and orthogonally intersecting said longitudinal wall.

2. A lock cylinder maintenance tool of claim 1 wherein the exterior semi cylindrical side wall of the non-cylindrical portion extends through an arc of greater than 180 degrees.

3. A lock cylinder maintenance tool of claim 1, and further comprising a cylindrical portion symmetrically oriented about the centerline and secured to the non-cylindrical portion so as to project therefrom in a collinear orientation, the cylindrical portion cooperating with the non-cylindrical portion so as to define a transverse wall at a juncture of the cylindrical portion and the non cylindrical portion.

4. The lock cylinder maintenance tool of claim 3, wherein the exterior semi-cylindrical side wall of the reducing exterior side wall extends into contiguous communication with a portion of the cylindrical wall of the cylindrical portion, wherein said exterior semi-cylindrical side wall and said cylindrical wall of said cylindrical portion have substantially the same radius of curvature.

5. A lock cylinder maintenance tool comprising:

a cylindrical portion having a centerline, a non-cylindrical portion secured to said cylindrical portion so as to project therefrom in a collinear orientation, said non-cylindrical portion including an exterior curvilinear side wall characterized as having a decreasing radius of curvature from said centerline and a longitudinal wall defined along said non-cylindrical portion so as to define a transverse wall at a juncture of the cylindrical portion and the non-cylindrical portion.

* * * * *